(12) United States Patent
Sauer

(10) Patent No.: US 9,121,516 B2
(45) Date of Patent: Sep. 1, 2015

(54) DOUBLE SEAT VALVE WITH RINSING VALVE

(71) Applicant: KRONES AG, Neutraubling (DE)

(72) Inventor: Martin Sauer, Kaisheim (DE)

(73) Assignee: KRONES AG, Neutraubling (DE)

( * ) Notice: Subject to any disclaimer, the term of this patent is extended or adjusted under 35 U.S.C. 154(b) by 84 days.

(21) Appl. No.: 13/669,723

(22) Filed: Nov. 6, 2012

(65) Prior Publication Data

US 2013/0056091 A1    Mar. 7, 2013

(30) Foreign Application Priority Data

Nov. 8, 2011   (DE) .......................... 10 2011 085 910

(51) Int. Cl.
*F16K 1/44*    (2006.01)
*B08B 9/093*   (2006.01)

(52) U.S. Cl.
CPC ................ *F16K 1/446* (2013.01); *B08B 9/093* (2013.01); *Y10T 137/4259* (2015.04)

(58) Field of Classification Search
USPC ......................................... 137/238, 240, 312
See application file for complete search history.

(56) References Cited

U.S. PATENT DOCUMENTS

| | | | |
|---|---|---|---|
| 1,831,457 A | 11/1931 | Larsen | |
| 5,645,102 A | 7/1997 | Brackelmann et al. | |
| 6,056,003 A | 5/2000 | Madsen et al. | |
| 6,293,300 B1 * | 9/2001 | Dumke et al. | 137/312 |
| 8,622,069 B2 * | 1/2014 | Ferreira | 137/240 |
| 2010/0132622 A1 | 6/2010 | Burmester et al. | |
| 2010/0243073 A1 | 9/2010 | Tolle et al. | |

FOREIGN PATENT DOCUMENTS

| | | |
|---|---|---|
| CN | 101795716 A | 8/2010 |
| DE | 68916823 T2 | 3/1995 |
| DE | 4243111 B4 | 2/2004 |
| DE | 20317882 U1 | 2/2004 |
| DE | 202006004173 U1 | 10/2006 |
| DE | 102007027765 A1 | 12/2008 |
| EP | 0332806 B1 | 7/1994 |
| EP | 0646741 B1 | 9/1996 |
| JP | 2009127761 A | 6/2009 |
| WO | WO-2009056277 A1 | 5/2009 |

OTHER PUBLICATIONS

Search Report for German Patent Application 10 2011 085 910.1, dated Jul. 20, 2012.
Notification of First Office Action, The State Intellectual Property Office of P.R. China, Application No. 201210441581.3, issue date Mar. 13, 2014.
European Search Report for Application No. 12191713.2 dated Mar. 25, 2014.

* cited by examiner

*Primary Examiner* — Kevin Lee
(74) *Attorney, Agent, or Firm* — Marshall, Gerstein & Borun LLP

(57) ABSTRACT

A valve device includes a double-seat and/or double seal valve and a cleaning valve to clean the leakage space of the double-seat and/or double seal valve. The axis of the cleaning valve forms an angle between 1° and 89° with the axis of the double-seat and/or double seal valve.

22 Claims, 2 Drawing Sheets

DOUBLE SEAT VALVE WITH RINSING VALVE

CROSS-REFERENCE TO RELATED APPLICATIONS

The present application claims the benefit of priority to German Patent Application 102011085910.1, filed Nov. 8, 2011, which is incorporated herein by reference in its entirety.

FIELD OF THE INVENTION

The invention comprises a valve device that comprises a double-seat and/or double seal valve, and a valve to clean the leakage space of the double-seat and/or double seal valve, which is referred to in the following as a cleaning valve, as well as a machine to fill containers and a device for the foodstuff and beverage processing industries, which respectively comprises one or several such valve devices.

BACKGROUND

Document WO 2009/056277 A1 discloses a double seat valve with a seat cleaning function and a method for cleaning the double seat valve with a seat cleaning function.

Document DE 689 16 823 T2, a translation of the European patent filing EP 0 332 806 B1, discloses a valve to control the flow of a sterile liquid and a feeding and cleaning device with such a valve. Steam can be introduced into the system disclosed in this document, for instance for sterilization, when the processing steps are suspended.

Document DE 42 43 111 A1 discloses an aseptic double seat valve device, document EP 0 646 741 A1 discloses a leakage-free, switching double valve configuration, and document DE 10 2007 027 765 A1 discloses a double seat valve.

Double seat valves and/or double seal valves are known from the state of the art. For instance, they are used to fill liquid or viscous substances into containers. In particular in the area of aseptic applications and/or foodstuff filling, cleaning valves are typically arranged vertically to the longitudinal axis of the primary valve to clean the leakage space.

This arrangement has the outcome that the feeding cleaning valve may not fully drain and that for instance cleaning agent residue, such as for instance cleaning fluids, condensate, or similar can form deposits in the cleaning valve or at the discharge of the cleaning valve. Furthermore, a bellows that is located in the leakage space can be directly exposed to flow due to the vertical configuration of the rinsing valve to the longitudinal axis of the primary valve, potentially causing an additional load on the bellows and therefore reducing the service life of the bellows.

An object of the invention is to solve one or several of the aforementioned problems known from the state of the art.

SUMMARY

The invention is asserted by a valve device in accordance with claim 1 and a machine to fill containers in accordance with claim 14, as well as a device in the area of foodstuff and beverage processing in accordance with claim 15.

In a preferred arrangement, a valve device according to the invention includes a double seat and/or a double seal valve, as well as a valve to clean the leakage space of the double-seat and/or double seal valve, which is referred to as a cleaning valve. In a valve device according to the invention, the axis of the cleaning valve forms an angle between 1° and 89° with the axis of the double-seat and/or double seal valve.

The angle between the axis of the first valve and the axis of the second valve can then be determined as follows. Originating from the leakage space, one vector each is determined parallel to the axis of the respective valve. In doing so, the direction of the vector is determined in that the vector points from the leakage space to the actuation side of the respective valve. The actuation side can be referred to as the side of a valve on which the actuation devices, such as for instance springs to open and close (move) the valve, are arranged. In order to determine the angle between the axis of the cleaning valve and the axis of the double-seat and/or double seal valve, the angle between the respectively associated vectors are now determined, that is to say between the vector parallel to the axis of the cleaning valve and the vector parallel to the axis of the double-seat and/or double seal valve. In doing so, the axis can intersect or be arranged in a skew manner to each other.

The term cleaning agent in the following can for instance comprise liquid, vaporous, viscous or similar materials, as well as residue of cleaning agents, such as condensate. Even if the following predominantly refers to cleaning agents, since this is a cleaning valve, other materials, such as for instance other liquids or viscous or vaporous materials can be analogously fed through the device, and in particular for instance through the cleaning valve.

The valve device can be embodied in such a manner that the axis of the cleaning valve forms an angle between 30° and 70° with the axis of the double-seat and/or double seal valve. This range of angles can permit a simplified design of the valve device and also establish advantageous properties when feeding the cleaning agent.

The valve device can in particular be embodied in such a manner that the angle between the axis of the cleaning valve and the axis of the double-seat and/or double seal valve forms an angle that is smaller than or equal to the difference of 90° and the seating angle of the cleaning valve. This can for instance simplify the draining of cleaning agents and/or cleaning agent residue into the leakage space.

The seating angle of the valve in this case refers to the angle that is formed by the wall of the valve along the opening with the axis of the valve. When considering the wall, the interior wall of the valve is preferably used, which for instance can also come into contact with the cleaning agent. The angle is measured in a plane that preferably comprises the axis of the valve. When no intersection exists between the wall and the axis of the valve, a first straight line can be determined that tangentially contacts the wall of the opening of the cleaning valve. A second straight line can also be determined that comprises the axis of the cleaning valve. The seating angle can then be determined as the intersecting angle of the first and second straight line.

A seating angle of a valve may be in a range from 0° to 90°. It may in particular range between 20° and 70°, in particular around 45° (e.g. 45°±10°).

The valve device may be configured in such a manner that the opening of the cleaning valve is configured as a single part with the double-seat and/or double seal valve. In particular, the opening of the cleaning valve may be configured as a single part with the wall of the double-seat and/or double seal valve. The remainder of the cleaning valve can then for instance be inserted into the opening.

This may be advantageous because this avoids gaps and openings between the opening of the cleaning valve and the double-seat and/or double seal valve. For instance, product residue, residue of cleaning agents and bacteria can accumulate in such gaps and openings between the opening of the cleaning valve and the double-seat and/or double seal valve, which are difficult to clean.

A valve device according to the invention may be configured in such a way that the exit orientation of the cleaning valve is arranged in such a way that cleaning agents discharging from the valve are partially or entirely guided from the cleaning valve in the direction of the valve plate of the double-seat and/or double seal valve. This may in particular mean that the cleaning agent discharging from the cleaning valve, or at least a portion of said cleaning agent, does not come into contact with an obstruction in the form of a component of the valve device prior to contacting the valve plate, if it is not redirected by turbulences or similar. The previously described characteristic and also the following characteristic for instance do not require that a cleaning agent is actually present in the cleaning valve, the leakage space, or elsewhere. It merely describes how fluids or similar would for instance behave in an embodiment due to the design of a device according to the invention.

Alternatively, or additionally, the valve device may also be configured in such a way that the exit orientation of the cleaning valve is arranged in such a way that the cleaning agent discharging from the cleaning valve is partially or entirely oriented in the direction (at least) of an area of the wall of the leakage space and/or is partially or entirely guided onto the bellows at an angle that is not vertical. Here again, the directional information may be understood as target information for a target, where the discharging cleaning agent or portions of it would contact without first making contact with other obstructions in the form of a component of the valve device, if it is not previously redirected by turbulences or similar.

A valve device according to the invention may be configured in such a manner that the straight line that comprises the axis of the cleaning valve intersects the straight line that comprises the axis of the double-seat and/or double seal valve (that is to say the respective axes). In doing so, the intersection can lie inside or outside of the leakage space or on the edge of the leakage space. Alternatively, the valve device can be configured in such a way that the axis of the cleaning valve and the axis of the double-seat and/or double seal valve are skew toward each other. In this case, the straight lines that each comprise the axis of the corresponding valves are not parallel to each other, but also do not intersect.

Alternatively, or additionally, the device may be configured in such a way that a vertical arrangement of the double-seat and/or double seal valve causes fluids that are present in the cleaning valve to completely drain into the leakage space when the cleaning valve is open. Additionally, or alternatively, the device may be configured in such a way that when the cleaning valve is closed, residue (for instance of the cleaning agent), such as for example condensate, can completely drain into the leakage space, that is to say specifically for example cannot collect at the valve opening.

In a vertical arrangement of the double-seat and/or double seal valve, the actuation side of the double seal valve (which may for instance comprise springs to move the double seat and/or double seal valve) may be arranged at the top. The fact that fluids located for instance at the discharge of the cleaning valve can drain, does not necessarily mean that the valve must actually be used for fluids. It may only describe that if a fluid were used, said fluid could drain into the leakage space, that is to say under the condition that the leakage space does not contain a fluid back-pressure that would prevent the drainage flow, that is to say e.g. a drain is opened, or similar.

In several embodiments, the valve device may be configured in such a way that the axis of the cleaning valve goes through the leakage space, that is to say the straight line that comprises the axis of the cleaning valve goes through the leakage space. The previously described straight line (axis) may have one intersection with the wall of the leakage space and/or have two intersections with the wall of the leakage space.

A valve device according to the invention may also comprise a drain in the leakage space. The drain can preferably comprise a valve, which is also subsequently referred to as a drain valve.

In particular, such a drain may be used to discharge cleaning agents, such as cleaning fluids. In several embodiments, the axis of the drain forms an angle of 90° or greater with the axis of the double-seat and/or double seal valve. In this case, the angle may be measured between two vectors, as already described previously. The first vector goes from the leakage space in the direction of the drain, where the direction of the drain can for instance be determined in that the exit orientation of a fluid from the leakage space is taken into consideration for non-turbulent flow. The direction of the drain then is the direction in which the fluid flows/would flow when discharging from the leakage space in a turbulence-free manner. The angle between this vector and the vector originating from the leakage space parallel to the axis of the double-seat and/or double seal valve in the direction of the actuation side of the valve may be determined. At a value equal to or greater than 90° for this angle, a cleaning agent can drain more easily, for instance in a vertical arrangement of the double-seat and/or double seal valve.

In several embodiments of a valve device according to the invention, the cleaning valve and/or the drain valve can each individually and/or respectively together be partially or completely opened and/or closed. This may enable a coordination of the feeding and draining of for instance a cleaning agent.

In several embodiments, the double-seat and/or double seal valve can remain closed during the cleaning of the leakage space. A cleaning valve that is used by a valve device according to the invention may comprise one or more feed lines for one or more different cleaning agents and/or other, for instance liquid, vaporous, or viscous substances.

In addition to the previously described cleaning valve, a valve device according to the invention may comprise an additional cleaning valve, where the axis of said additional cleaning valve can form an angle for instance of approximately 90°, or between 85° and 95°, with the axis of the double-seat and/or double seal valve. Such an additional cleaning valve may for instance be configured in such a way that due to its arrangement said additional cleaning valve is suited to feed cleaning agents into different areas of the leakage space than the previously described, first cleaning valve. Alternatively and/or additionally, such a cleaning valve may also be used or provided as a drain.

The invention also comprises a machine for filling containers and a device in the foodstuff and beverage processing industries, such as a bottling plant or a tank warehouse, in particular for example in the aseptic field, which each comprise one or several of the previously described valve devices.

Further embodiments and advantages of the invention are subsequently described based on the figures.

DETAILED DESCRIPTION

Figure 1:
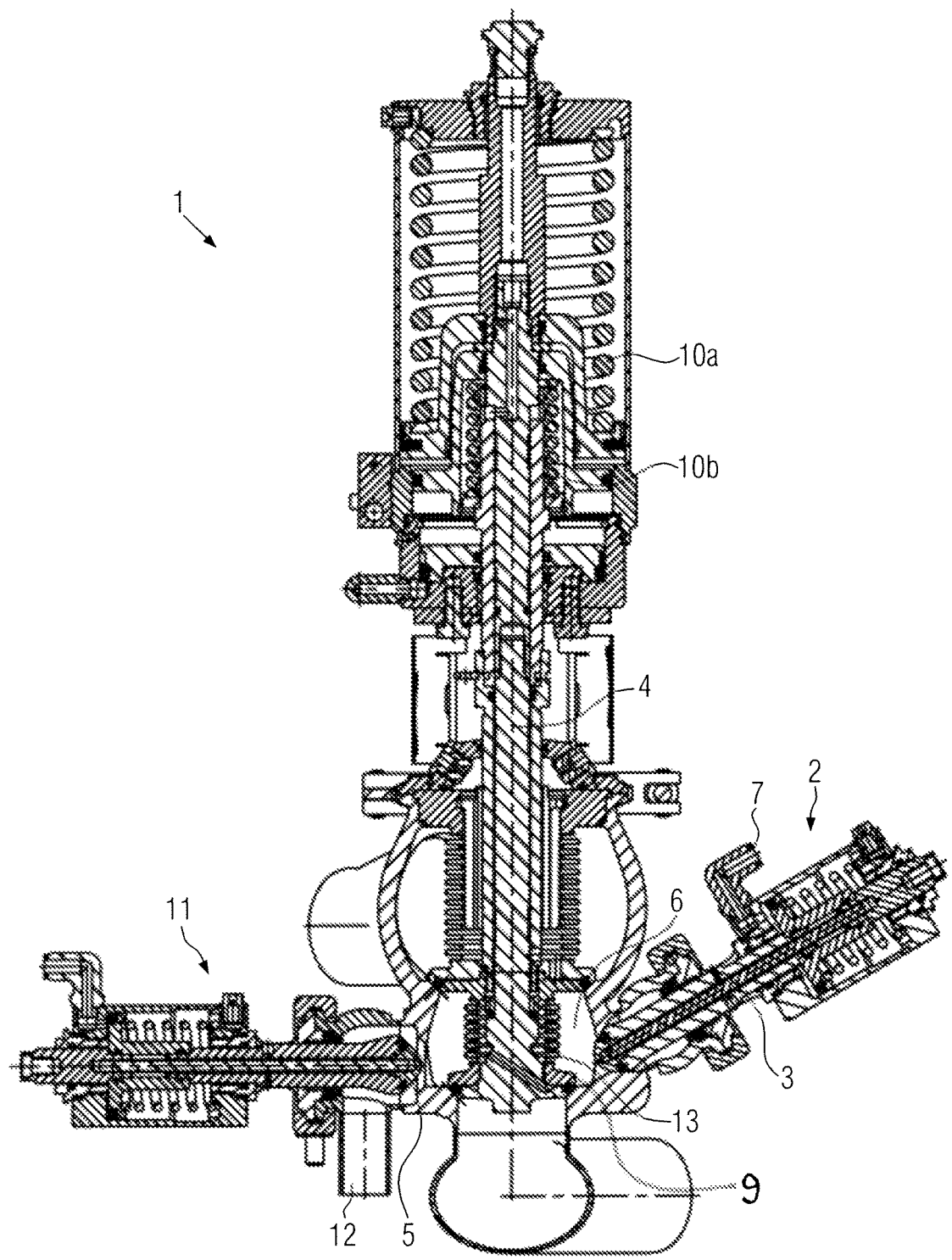
FIG. 1 shows a valve device.

One embodiment of a valve device according to the invention includes a double-seat and/or double seal valve 1. It furthermore includes a cleaning valve 2. The axis of the cleaning valve is marked by 3 and the axis of the double-seat and/or double seal valve is marked by 4. A valve device according to the invention may furthermore comprise a leakage space 6. As is shown in FIG. 1, a device according to the invention may comprise a further valve 11, which may be configured as a second cleaning valve, as is shown here exemplarily. Additionally, or alternatively, this valve 11 may act as a drain valve in this embodiment, which can drain fluids that are present in the leakage space, such as for example cleaning agents and/or other material states, such as steam or similar, through the optional drain tube 12, when said valve is opened. In other embodiments, a drain may be configured differently.

A double-seat and/or double seal valve may comprise one or several springs 10a, 10b, that can be used to open and/or close (move) the double-seat and/or double seal valve 1. These may represent a portion of the actuating device of the double-seat and/or double seal valve 1. FIG. 1 shows a double-seat and/or double seal valve 1 that is arranged vertically, where the springs 10a, 10b are arranged above the leakage space 6. This is an example for an arrangement of a double-seat and/or double seal valve that may be installed for use in the shown arrangement. Even a slanted arrangement is possible, where the axis 4 of the double-seat and/or double seal valve 1 for instance forms an angle between 0° and 50°, in particular between 0° and 25°, in particular between 0° and 5° with the vertical.

The embodiment in FIG. 1 also discloses why an arrangement of the cleaning valve 2 that forms an angle of one axis 3 between 1° and 89°, in particular between 30° and 70° with the axis 4 of the double-seat and/or double seal valve 1, may be advantageous, for instance with a vertical arrangement of the valve device. Namely, in several embodiments, this slanted positioning of the cleaning valve 2 is capable of completely or largely draining fluids or other viscous or vaporous materials that are present in the cleaning valve 2 into the leakage space 6, for instance to clean the leakage space 6 when the cleaning valve is opened and/or to completely or largely drain residue or cleaning agents from the area of the opening of the cleaning valve 2 into the leakage space 6 when the cleaning valve 2 is closed (at least when a drain from the leakage space 6 is present and opened, thus preventing backpressure from forming that prevents the fluid from draining). In addition, the slanted arrangement of the cleaning valve 2 may prevent the bellows 13 of the leakage space 6 to be directly exposed to flow. This can reduce the likelihood of damaging said bellows 13 for instance by cleaning agents, and can therefore increase the service life of the bellows.

Furthermore, due to a slanted arrangement of the cleaning valve 2, as described before, the discharge direction of cleaning agents or similar from the cleaning valve 2 can for instance be arranged in such a way that all or portions of the discharging cleaning agent can be directly imparted on the valve plate 9. This can result in improved cleaning of the valve plate 9. Additionally, the arrangement can result in increased turbulence of the cleaning agent, which can lead to an improved cleaning action.

Additionally, or alternatively, the arrangement of the cleaning valve 2 may be such that the exit orientation of cleaning agents or similar from the cleaning valve is such that all or portions of the discharging cleaning agent cannot be directly imparted on the valve plate 9, and/or can be imparted on the wall of the leakage space, and/or can be imparted on the bellows 13 at an angle different than 90° to the axis of the double-seat and/or double seal valve.

In several embodiments of the invention, the drain may be arranged in such a manner that said drain begins at the lowest point of the leakage space 6, wherein the double-seat and/or double seal valve 1 is considered in a vertical arrangement. In the embodiment shown here in FIG. 1, the drain, as in several potential embodiments, is arranged in such a manner that the axis of said drain is vertical to the axis of the double-seat and/or double seal valve in the part adjacent to the leakage space. As is shown here, following a short or longer horizontal area, a drain tube 12 or similar may then be directed in several embodiments in parallel to the axis of the double-seat and/or double seal valve. A drain tube is also possible in another direction, which preferably is in a direction so that a vertical arrangement of the double-seat and/or double seal valve causes cleaning agents, such as for instance liquid, viscous or vaporous cleaning agents to drain downward.

Figure 2:
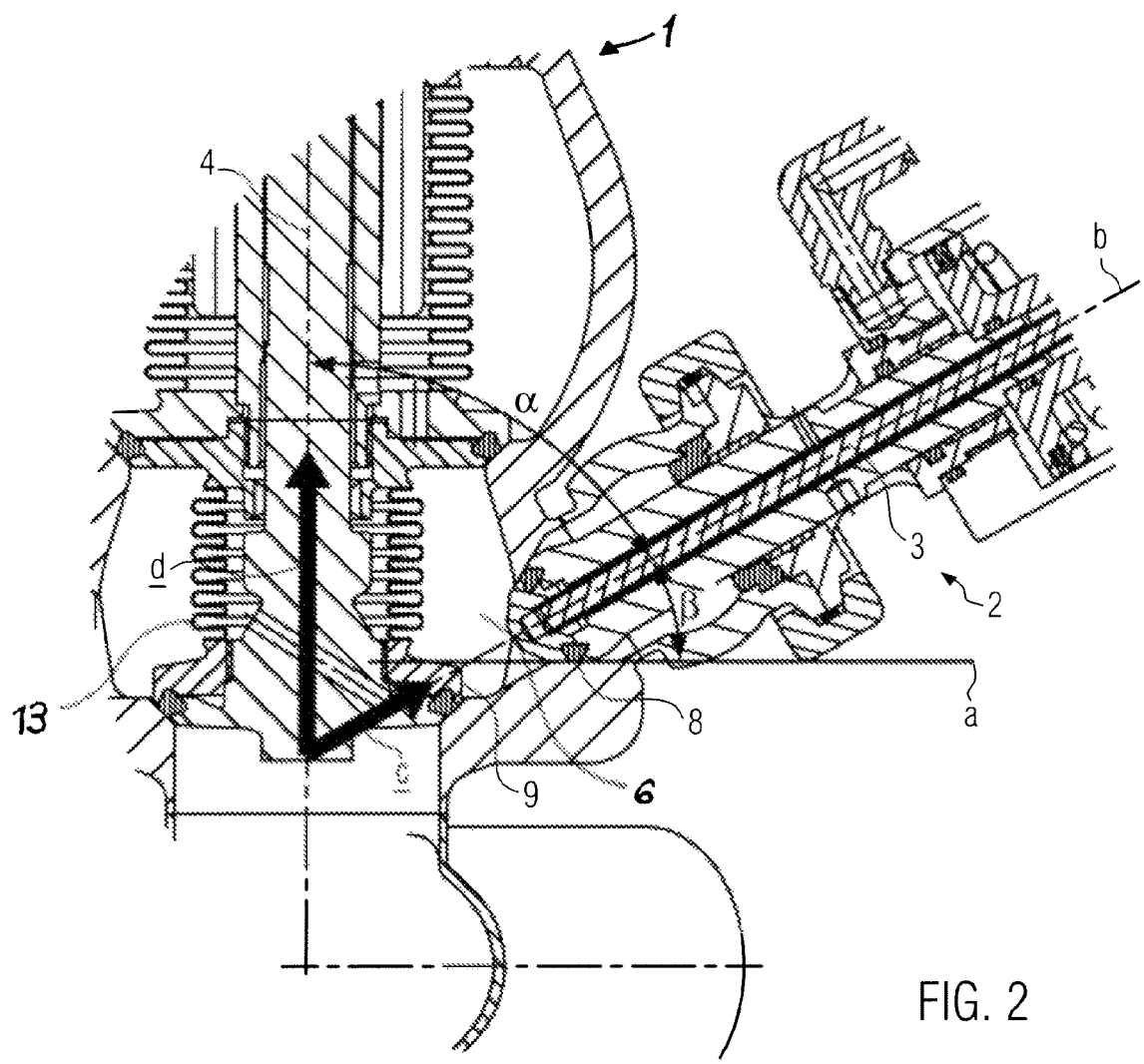
FIG. 2 shows a schematic cross-section of a valve device.

FIG. 2 shows a cross section of an embodiment of the valve device according to the invention. Axis 4 of the double-seat and/or double seal valve 1 is drawn, as well as axis 3 of cleaning valve 2.

FIG. 2 shows that the angle between the axis of cleaning valve 3 and the axis 4 of the double-seat and/or double seal valve 1, the angle $\alpha$, has a value ranging between 1° and 89°. In particular, said angle $\alpha$ has an approximate value of 60° in the case shown. The direction of the vectors $\underline{c}$ (parallel to the axis of the cleaning valve 2) and $\underline{d}$ (parallel to the axis of the double-seat and/or double seal valve 1), which can be used to determine the angle is drawn in FIG. 2.

The seating angle of the cleaning valve 2 that is designated as $\beta$ in FIG. 2 has an approximate value of 30° in this case. The drawing also shows the straight lines a, b, which are used to determine the seating angle $\beta$.

In the arrangement of an embodiment shown in FIG. 2, the axis 3 of the cleaning valve 2 forms an angle $\alpha$ with the axis 4 of the double-seat and/or double seal valve 1 of 90°−$\beta$. In other embodiments, this angle $\alpha$ between the axis 3 of the cleaning valve 2 and the axis 4 of the double-seat and/or double seal valve 1 may also be smaller than 90°−$\beta$. In contrast to FIG. 2, this case does not have a region, which is shown here as region 8, along the discharge of the cleaning valve, where said region 8 is horizontal to the axis 4 of the double seal valve 1, but instead, this region 8 also is at a slant in other embodiments (that is to say forms an angle with the horizontal), so that cleaning agents can drain more easily.

In the embodiment shown in FIG. 2, the opening of the cleaning valve (2) is configured as a single part with the wall of the double-seat and/or double seal valve (1).

In the embodiment shown in FIG. 2, as in several embodiments of the invention, cleaning agents discharging from cleaning valve 2 (or at least a portion of said cleaning agents) can directly reach valve plate 9 without first coming into contact with other components.

In the embodiment shown in FIG. 2, the axis 4 of the double-seat and/or double seal valve 1 and the axis 3 of the cleaning valve 2 intersect in the area of the leakage space 6. In other embodiments, the two axes 3, 4 can also be in a skew arrangement to each other.

The invention claimed is:

1. A valve device comprising a double-seat or double seal valve and a cleaning valve to clean a leakage space of the double-seat or double seal valve, wherein an axis of the cleaning valve forms an angle $\alpha$ between 1° and 89° with an axis of the double-seat or double seal valve, wherein the valve device comprises a bellows located in the leakage space and wherein the valve device comprises a drain in the leakage space, and an axis of the drain forms an angle greater than 90° with the axis of the double-seat or double seal valve.

2. A valve device in accordance with claim 1, wherein the angle α is between 30° and 70°.

3. A valve device according to claim 1, wherein an opening of the cleaning valve is formed as a single part with the double-seat or double seal valve.

4. A valve device in accordance with claim 1, wherein an exit orientation of the cleaning valve is arranged in at least one of: such a manner that cleaning agents can be directed from the cleaning valve in the direction of a valve plate of the double-seat or double seal valve, or such a manner that an exit orientation of the cleaning valve is arranged in such a manner that cleaning agent is directed in the direction of a region of a wall of the leakage space.

5. A valve device in accordance with claim 1, wherein the axis of the cleaning valve and the axis of the double-seat or double seal valve intersect, or that the axes of the cleaning valve and the double-seat or double seal valve are skew to each other.

6. A valve device in accordance with claim 1, wherein the cleaning valve is arranged in such a manner that a vertical arrangement of the double-seat or double seal valve causes fluids or residue present in the cleaning valve to drain completely into the leakage space when the cleaning valve is open or closed or when the cleaning valve is open and closed.

7. A valve device in accordance with claim 1, wherein the axis of the cleaning valve goes through the leakage space.

8. A valve device in accordance with claim 1, the valve device drain in the leakage space comprising a valve that serves as a drain valve.

9. A valve device in accordance with claim 8, wherein the drain is arranged in such a manner that the drain begins at the lowest point of the leakage space when the double-seat or double seal valve is oriented vertically.

10. A valve device in accordance with claim 8, wherein the cleaning valve and the drain valve can each be one of: opened or closed; opened and closed together or individually; or opened and closed together and individually.

11. A valve device in accordance with claim 1, the cleaning valve comprising one or several feed lines for one or several cleaning agents.

12. A valve device in accordance with claim 1, wherein the valve device additionally comprises a further cleaning valve, where the axis of said further cleaning valve forms an angle of approximately between 85° and 95° with the axis of the double-seat or double seal valve.

13. A valve device in accordance with claim 1, the angle between the axis of the double-seat or double seal valve and the cleaning valve, which has a seating angle β, and the angle α is smaller, or equal to the difference of 90° and the seating angle β.

14. A valve device in accordance with claim 2, wherein the cleaning valve or a drain valve in the leakage space can each be opened or closed or opened and closed individually.

15. A valve device in accordance with claim 8, wherein the cleaning valve and the drain valve can each be opened and/or closed individually.

16. A device in foodstuff and beverage processing industries, wherein the device comprises one or several valve devices in accordance with claim 1.

17. A device according to claim 16, wherein the foodstuff and beverage processing industries includes a bottling plant or a tank warehouse.

18. A machine for filling containers, wherein the machine has one or several valve devices in accordance with claim 1.

19. A device according to claim 16, wherein the foodstuff and beverage processing industries is in an aseptic field.

20. A valve device comprising an aseptic double seat or double seal valve and a valve to clean a leakage space of the double-seat or double seal valve, which is referred to as a cleaning valve, wherein an axis of the cleaning valve forms an angle between 1° and 89° with an axis of the double-seat or double seal valve, wherein the valve device has a bellows located in the leakage space and is configured in such a way that an exit orientation of the cleaning valve is arranged so a cleaning agent discharging from the cleaning valve is partially or entirely guided past the bellows in the direction of a valve plate of the double-seat or double seal valve or in the direction of an area of a wall of the leakage space.

21. A valve device comprising an aseptic double seat or double seal valve and a valve to clean a leakage space of the double-seat or double seal valve, which is referred to as a cleaning valve, wherein an axis of the cleaning valve forms an angle between 1° and 89° with an axis of the double-seat or double seal valve, wherein the valve device has a bellows located in the leakage space and is configured in such a way that an exit orientation of the cleaning valve is arranged so a cleaning agent discharging from the cleaning valve is partially or entirely guided onto the bellows at an angle that is not vertical.

22. A valve device comprising a double seat or double seal valve and a valve to clean a leakage space of the double-seat or double seal valve, which is referred to as a cleaning valve, wherein an axis of the cleaning valve forms an angle between 1° and 89° with an axis of the double-seat or double seal valve, wherein the valve device comprises a bellows located in the leakage space, and wherein the axis of the cleaning valve and the axis of the double-seat and/or double seal valve are skew to each other.

* * * * *